E0152 XR 2,801,295 parallel bandpa TV channel

July 30, 1957 S. SABAROFF 2,801,295

MULTI-CHANNEL REPEATER AND AMPLIFIER SYSTEM

Filed April 23, 1951 2 Sheets-Sheet 1

INVENTOR.
SAMUEL SABAROFF
BY Leon Edelson
ATTORNEY

July 30, 1957 S. SABAROFF 2,801,295

MULTI-CHANNEL REPEATER AND AMPLIFIER SYSTEM

Filed April 23, 1951 2 Sheets-Sheet 2

INVENTOR.
SAMUEL SABAROFF
BY [signature]
ATTORNEY 2,801,295

MULTI-CHANNEL REPEATER AND AMPLIFIER SYSTEM

Samuel Sabaroff, Philadelphia, Pa., assignor of one-third to Donald R. Trilling and one-third to Edward M. Beeler, Philadelphia, Pa.

Application April 23, 1951, Serial No. 222,414

1 Claim. (Cl. 179—171)

The present invention relates to multi-channel repeater and amplifier systems, and more particularly to multi-channel repeater and amplifier systems which are adapted to be connected between signal trunk lines in television antenna signal distribution systems and the like for adjusting and boosting signal levels.

In a television antenna signal distribution system, for example, a trunk line consisting of a co-axial cable may extend from a signal source, such as an antenna, through a building or other installation to supply signals to a plurality of load points or outlets, such as, standard television signal receivers. Due to losses in transmission, it is often desirable to amplify the signal or certain frequency bands thereof, at certain points along the line and to supply the amplified signal to a second trunk line or trunk lines to feed the various outlet points or load devices.

Since television programs are transmitted on a plurality of frequency bands or channels, distribution trunk lines must carry a plurality of signal frequencies or bands, and in amplifying such signals between trunk lines it is necessary to amplify at a plurality of different frequencies corresponding to the high frequency signal or program channels used.

It is a primary object of this invention, therefore, to provide an improved multi-channel repeater and amplifier system which is adapted to select specific combined signals or signal bands from a signal conveying trunk line or the like, to amplify such signals selectively and in any desired proportions relatively, and to combine said signals again in a second signal conveying trunk line.

It is also an object of this invention, to provide an improved multi-channel repeater and amplifier system which may be inserted in and effectively couple two signal conveying trunk lines or cables without introducing undesired impedance changes or other undesirable operating characteristics into said trunk lines.

It is a still further object of this invention to provide an improved multi-channel repeater and amplifier system wherein either or both of the input and output circuits may have a broad-band frequency characteristic and wherein the coupling between said input and output circuits is provided with a band-pass characteristic for each signal frequency or channel to be conveyed therethrough.

In accordance with the invention, a signal conveying trunk or co-axial cable line is provided with a low pass filter serially connected therein at the input end of the amplifier system. The series inductor elements of the filter are provided by relatively short lengths of conductor directly in the trunk line, while the capacity elements of the filter are provided by the inter-electrode capacities of the input amplifier tubes for each of a plurality of electronic tube band-pass amplifiers. In a similar manner, a broad-band characteristic output may be provided by a second low pass filter circuit inserted serially in a second or outgoing trunk line, the capacitor elements of the filter being provided by the inter electrode capacities of the output tubes of each band pass amplifier.

In accordance with the invention further, the input and/or the output circuits of the parallel band-pass amplifiers connecting two signal trunk lines may be tuned for greater selectiviity in certain signal channels. In such cases the output gain is considerably raised as will hereinafter appear.

The amplifier tube capacities being incorporated into the low pass filter circuits, either for input or for output of each amplifier channel, serve to improve the signal transmissions through the coupled trunk lines and considerably aid in lowering the signal attenuation through each trunk line. A further advantage lies in the fact that the various signal or frequency bands in the output signal in the second or outgoing trunk line may be adjusted in level or gain in each individual amplifier.

The invention will, however, be further understood from the following description when considered in connection with the accompanying drawings, and its scope is pointed out in the appended claims.

Figure 1:
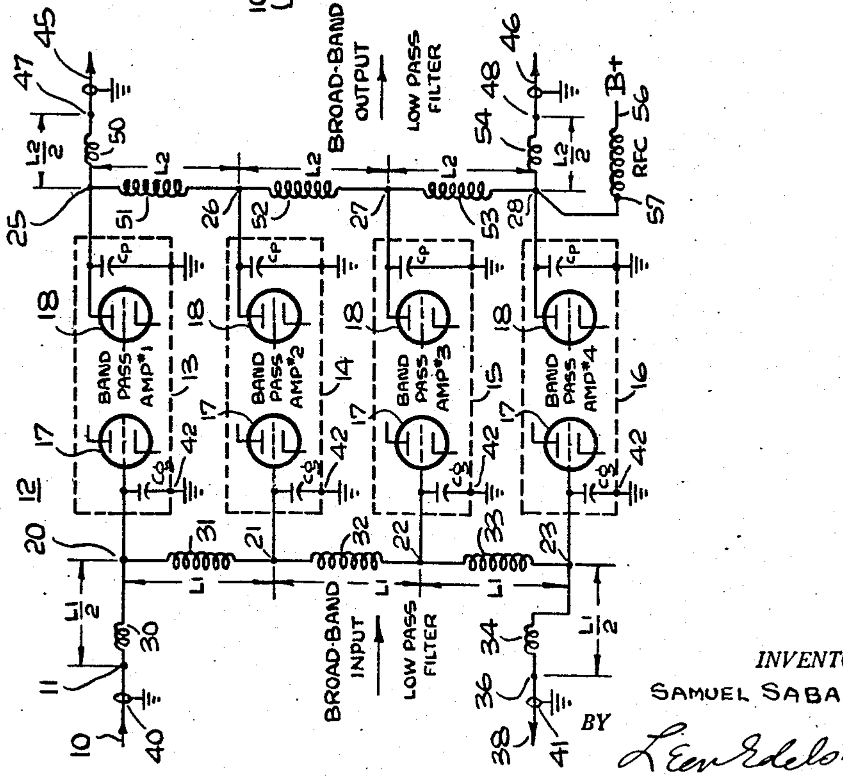
Figure 1 is a schematic circuit diagram of a multi-channel repeater and amplifier system embodying the invention.
Figures 4, 5:
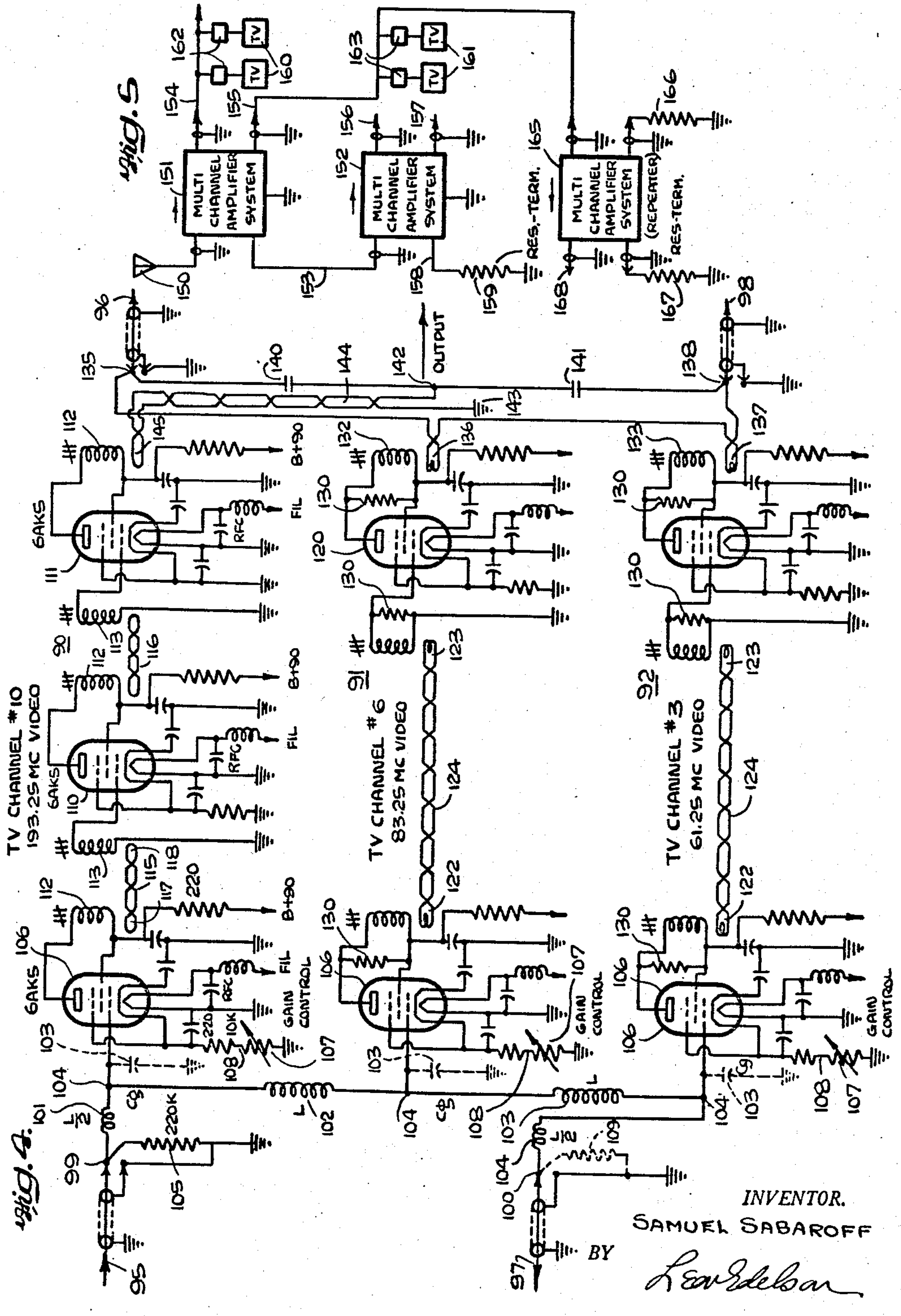

Figure 4 is a further schematic circuit diagram of a multi-channel repeater and amplifier system in accordance with the invention for television signal trunk lines carrying a plurality of program channels or frequency bands, and Figure 5 is a block circuit diagram showing a plurality of multi-channel repeater and amplifier units of the type shown in Figures 1 and 4, as applied to a multiple unit signal distribution system for television receivers and the like.

Referring to Figure 1, a co-axial cable or trunk line 10 is connected to an input terminal 11 of a multi-channel repeater and amplifier system 12 comprising a plurality of band-pass electronic tube amplifiers 13, 14, 15 and 16. Each of the band pass amplifiers includes an input or first stage electronic amplifier tube 17 and an output stage electronic amplifier tube 18 between which may be interposed other amplifier stages (not shown) as required to provide desired signal amplification between input terminals 20, 21, 22 and 23 and output terminals 25, 26, 27 and 28 respectively, for a plurality of band-pass amplifiers 13–16, inclusive for the system.

The inter-electrode or grid capacities for the input tubes 17, which appear between each input terminal 20—23 and ground, are indicated at *Cg* in each channel. Likewise the output inter-electrode capacities of the amplifier tubes in the several channels are indicated at *Cp* in the various channels and appear between the terminals 25—28 and ground. The band-pass amplifier input terminals 20, 21, 22 and 23 are, in practice, spaced and connected by a series of inductance elements 30, 31, 32, 33 and 34.

In this manner, the inductance element 30 is provided between the input terminal 11 for the system and the first channel input terminal 20, and the remainder of the series of inductance elements 31, 32 and 33 are effectively connected successively between the input terminals of the separate amplifier input terminals 20, 21, 22 and 23 as shown. Between terminal 23 and an output terminal 36 for the trunk line, the inductance element 34 is provided, and the terminal 36 is in turn connected to an outgoing end 38 of the co-axial cable or trunk line 10.

The inductance elements 30–34 inclusive, may be provided in television trunk systems by portions of the conductor 10—38 and may be of a varying size of conductor as required to attain proper inductance values. At the high frequencies encountered in television signal band amplification, for example, the inductors are relatively short, straight leads and are of such inductance value as to give a low-pass filter characteristic to the trunk line 10—38 between the terminals 11 and 36 when associated in connection with the input amplifier tube capacities $Cg$. The relation of the inductance values are given by the reference letter L1. It will be noted that the inductor elements 30 and 34 are substantially one-half of the inductance values of the inductor portions 31, 32 and 33. Since the shielded trunk line or co-axial cable is grounded as indicated at 40—41, and since the band-pass amplifier portions are grounded as indicated at 42, it will be seen that the low pass filter between the terminals 11 and 36 comprise successive alternate inductor elements 30, 31, 32, 33 and 34 and capacitor elements $Cg$ connected with the band-pass amplifier input terminals 20, 21, 22 and 23 between the inductor elements.

With this arrangement, the tube capacities are thus incorporated into a low-pass filter covering all of the frequency bands to be passed by several amplifier units and serve to improve the signal transmission and reduce signal attenuation instead of attenuating the signals as is normally the case in such multiple amplifier circuits. Signals traveling through the trunk line 10—38 are therefore substantially unattenuated between the terminals 11 and 36 while at the same time feeding the several band-pass amplifiers for the transmission of signals therethrough at the separate response bands or channels provided in each case.

In a similar manner, as with the broad-band input circuit above described, a broad-band output circuit may be provided for the several band-pass amplifiers in connection with an outgoing or second co-axial cable or trunk line comprising two shielded output leads 45 and 46 connected with two output terminals 47 and 48, respectively. The trunk line connection between the output terminals 47 and 48 comprise trunk line inductor elements 50, 51, 52, 53 and 54 serially connected with the output terminals 25, 26, 27 and 28 for the band pass amplifiers as for the input connections above described.

As in the input circuit, the inductor elements 50 and 54

$$\frac{L2}{(2)}$$

are substantially one-half the value of the series inductor elements 51, 52, and 53 (L2) between the amplifier output terminals 25—28. As in the input network, the anode-to-ground capacities $Cp$ may be utilized as shown, to provide a low-pass filter circuit rather than to load the circuit and attenuate signals. Thus, the tube capacities across the signal paths serve to improve the signal transmission through the trunk lines. In the case of the circuit shown, positive anode potentials are applied to the tubes 18 from a positive supply lead 56 to one of the output terminals, such as, the terminal 28 through an isolating R.-F. choke coil 57.

The system shown thus provides a multi-channel repeater and amplifier wherein a plurality of pass-bands are provided between the input and output trunk line or cable connections and wherein either the input or output or both coupling connections within the cable trunk lines may be given broad-band frequency characteristics suitable for conveying a plurality of signals or frequency bands. Within the connecting band-pass amplifiers are provided means for selectively transmitting the several signal bands with any desired degree of amplification, and in the over-all system this is accomplished without appreciably attenuating the signals in the trunk lines. This is particularly valuable in television signal conveying or distribution systems, since by providing a low-pass filter characteristic in connection with the tube capacities for the several amplifier channels, low signal attenuation is effected at the high frequencies encountered.

Figure 2:
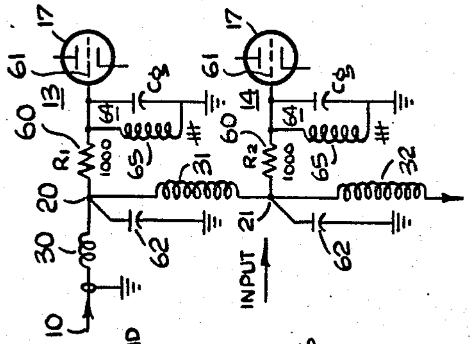

Referring now to Figure 2 along with Figure 1, the signal input tubes 17 for channels 13 and 14 are shown in connection with input terminals 20 and 21 but with certain interposed isolating and tuned coupling means in each channel, as illustrative of the other two amplifier input circuits which are not shown. In each channel this comprises a series isolating resistor 60 between each tube input electrode 61 and the respective input terminals 20 and 21 et seq. Separate filter capacity elements 62 between each terminal 20 and 21 to ground, for maintaining the low pass filter characteristic for the inductor elements 30, 31, 32 et seq. in the trunk line 10 are provided, since the input electrodes and their capacities $Cg$ are isolated from the input terminals by the resistors 60. In this modification of the amplifier input circuits, it will be noted that between the input electrodes 61 and ground there are connected tuned circuits 64 each comprising a tunable inductor 65 in shunt across the input electrode capacity $Cg$ as indicated. Thus, each band-pass amplifier is caused to be more highly responsive to its respective signal band since only the signals to be amplified appear on each grid with any appreciable amplitude. This is a desirable coupling arrangement for trunk lines carrying strong signals as there is less overload on the input tubes of each channel and less cross-talk between the channels with this arrangement.

As will be seen from a comparison of Figures 1 and 2, the latter circuit provides for maintaining the low-pass filter characteristic of the trunk line or co-axial cable connection by the use of additional shunt capacitors 62 connected to ground between the series connected elements of the line, and for decoupling or isolating the input amplifier tubes for each band-pass amplifier by means of resistors 60 connected between the tube grids or input electrodes and the input terminals for each channel. The amplifiers are further individually tuned by variable or tunable inductance elements connected in shunt across the tube input capacities which serve as tuning capacitors. This provides improved response in the selected frequency band for each channel.

Figure 3:
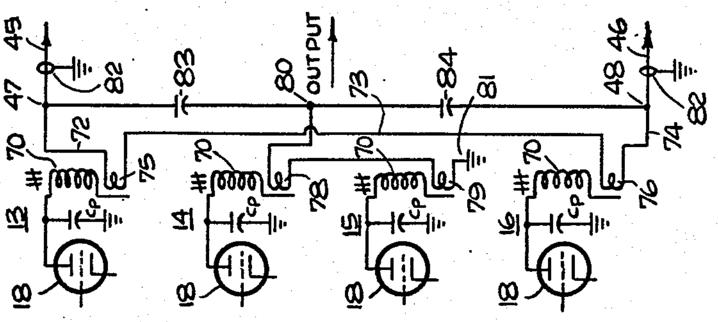
Figures 2 and 3 are schematic circuit diagrams of portions of the circuit of Figure 1 showing modifications in accordance with the invention.

Referring now to Figure 3 along with Figures 1 and 2, a higher gain through each band pass channel with the same number of tubes may be provided by tuning the output anode circuits and inductively link coupling the tuning inductance elements to the output trunk lines. In the present example the output tubes 18 for the four channels shown in Figure 1 are each provided with a tunable output anode circuit inductor 70 in shunt with which as a tuning capacitor, is connected the tube output anode capacity $Cp$. Assuming that the amplifying channels 13 and 16 are responsive to two lower frequency bands and amplifier channels 14 and 15 are responsive to two higher frequency bands, link circuit coupling is provided between the output trunk lines 45 and 46 serially with the low frequency channels and in parallel with the high frequency channels, as indicated.

In the present example, between the output terminals 47 and 48 there are connected through leads 72, 73 and 74, two link coupling coils 75 and 76, which in turn are inductively coupled respectively with the output tuning inductors 70 of the channels 13 and 16. Similar link coupling inductance elements 78 and 79 for the high frequency channels 14 and 15 are connected between a terminal 80 and ground 81, which is common with the cable grounds 82. The terminal 80 is coupled through coupling capacitors 83 and 84 with terminals 47 and 48, respectively, so that the circuit including link coupling elements 78 and 79 for the high frequency amplifiers is connected in parallel with outgoing cables 45 and 46, whereas the link coupling coils 75 and 76 for the lower frequency amplifiers are connected serially between the outgoing cables 45 and 46. This has been found to provide a better signal distribution arrangement in that the impedance of the link coupling for low frequency amplifiers 13 and 16 is sufficiently high to prevent appreciable loss of high frequency signals, and the impedance of the coupling capacitors 83 and 84 for the high frequency bands is sufficiently high to prevent appreciable loss of signals from the low frequency bands.

While the circuit of Figure 3 is a selective signal output type of circuit as compared with the broad-band output circuit of Figure 1, it possesses the advantage that a higher gain may be provided for each amplifier with the same number of tubes. In many cases however, a broad-band output or a broad-band input or both, may be provided in connection with a multiple band-pass amplifier of the type shown which comprises parallel band-pass amplifiers in sufficient number to convey between the inter-connected trunk lines any desired number of signals, channels or frequency bands. The four-band system described is only shown by way of example. Any number of parallel band-pass amplifier paths may be provided as required to effectively couple the two trunk lines, whereby specific signals from many carried by a trunk line, may be selected therefrom, selectively amplified and effectively combined and inserted into another trunk line.

Referring now to Figure 4, a multi-channel amplifier system is shown for coupling two trunk television signal conveying lines to provide signal amplification and selective level control. By way of example, three band pass amplifiers 90, 91 and 92 are shown for amplifying television Channels Ten, Six and Three, respectively, or any other three bands of selectable signal frequencies, and for effectively coupling an incoming trunk line 95 with outgoing trunk lines 96 and 98. The trunk line 95, which continues at 97, is connected with trunk terminals 99 and 100 of the repeater and amplifier system and are further connected by the series connected inductor elements 101, 102, 103 and 104. These provide a low-pass filter connection incorporating the input tube electrodal capacities 103 at each channel input terminal 104, in a similar manner to the low pass filter arrangement provided and described in connection with Fig. 1, for example.

The input end of the trunk line is provided with a grid resistor 105 in the present example, and the input tube 106 of each band-pass amplifier is provided with gain control means shown in the present example as a variable resistor 107 in the cathode circuit 108 of the tube, also the input and the output circuits of each of the several amplifier tubes of each signal channel except the first input circuit are tuned by means of inductor elements associated with the tube electrodal capacities.

In band-pass amplifier 90 for TV Channel Ten, in addition to the input or first stage amplifier tube 106, there are provided an intermediate amplifier tube 110 and an output amplifier tube 111. The output circuits of the tubes 106, 110, 111 are each tuned by variable tuning inductors 112 and associated tube and stray capacities in the anode circuits, while the input grid circuits of the intermediate amplifier tube 110 and of the output tube 111 are tuned by variable grid circuit inductors 113 and the associated tube and stray capacities, whereby the amplifier responds to a selected signal band.

Between stages are provided link coupling circuits 115 and 116. The link coupling between the output tuning inductor 112 of the first stage and input tuning inductor 113 of the intermediate stage is provided by the link coupling circuit 115, while the coupling between the output tuning inductor 112 of the intermediate stage and the input tuning inductor 113 of the output stage is provided by the link coupling circuit 116. For TV Channel Ten, the link coupling may consist of a single turn inductor 117 wound adjacent one end of the tuning inductor 112 and a second single turn inductor 118 wound adjacent one end of the input tuning inductor 113 for the intermediate stage. The single turn inductors are connected by conductors comprising a twisted pair of leads as indicated. The similar link circuit 116 is provided in a similar manner for coupling the output and input tuning inductors 112 and 113, respectively, for the intermediate amplifying tube 110 and the output amplifier tube 111.

The band-pass amplifiers 91 and 92 are provided with output amplifier tubes 120 and 121, respectively, coupled to the input tubes 106 by tuned circuits similar to those of the first channel 90 and similarly tuned and link-coupled except that preferably the link elements 122 and 123 at opposite ends of link coupling circuits 124 are wound with two turns instead of one, as in channel 90, and that the intermediate amplifier tube 110 is not required, as sufficient gain is provided in the lower frequency channels with but two stages normally. In practice, all of the amplifier tubes may be provided by amplifier tubes known commercially as type 6AK5 or the like, as indicated.

The relative signal frequencies to be amplified are likewise indicated as 193.25 mc. for TV Channel Ten, 83.25 mc. for TV Channel Six and 61.25 mc. for TV Channel Three, each amplifier providing band-pass operation to include these frequencies. It will also be noted that in order to broaden the response of the amplifier channels 91 and 92, shunt resistors 130 may be provided across the tuned input and output circuits of certain amplifier stages. Otherwise, the amplifier stages are the same as shown and described in connection with the amplifier channel 90.

In the output of the channels 91 and 92, reference is made to output tuning inductors 132 and 133 respectively for the two channels, and the output coupling for the trunk line 96—98 provided in accordance with the arrangement substantially as shown in Fig. 3. In this arrangement an output terminal 135 for the trunk line 96 is connected through a two turn coupling link coil 136 and a series connected coupling link coil 137 to an output terminal 138 for the trunk line 98. The coupling link coil 136 is in inductive coupling relation at one end of the inductor 132 for the output anode circuit in the tube 120 in channel 91. The coupling link 137 is likewise inductively coupled with the output anode inductor 133 for the channel 92.

Thus, the low frequency channels are connected serially between the output trunk lines as in the circuit of Figure 3 and the high frequency channel, in this case amplifier 90, is connected in shunt with the output terminals 135 and 138, respectively, through coupling capacitors 140 and 141 connected with each terminal 135 and 138. The common terminal 142 between the capacitors and the ground end are connected through a twisted pair of conductors 144 to provide a link circuit terminating at a single turn coupling loop 145 inductively coupled with the output coil 112 for amplifier 90. In this case, the single turn coupling loop 145 is suitably spaced from one end of the coil 112 to provide a desired degree of coupling. The link circuit 144—145 is thus connected in parallel between the two output terminals 135 and 138.

As heretofore noted, the function of this system is to select specific signals from a trunk line conveying the signals, to amplify the selected signals, and finally to combine the amplified signals for insertion into another trunk line.

The input circuit is composed of the inductors L/2 and L and the control-grid-to-ground capacities $Cg$ of the three input vacuum tubes. These inductors are chosen so that in conjunction with the tube input capacities, a low pass filter with a cutoff frequency greater than the highest utilized frequency is provided, and with a characteristic impedance equal to that of the feeding trunk line. The input circuit has, therefore, a negligible effect on the continuity of the trunk line. If it is not desired to continue a trunk line, then a resistance equal to the characteristic impedance of the line must be placed on the unused terminal, as shown, for example, at 109 in connection with terminal 100 and output trunk line connection 97.

The initial signal selection takes place in the plate circuit of the first tube 106 of each amplifier. This circuit is link coupled to the input circuit of the succeeding tube and the coefficient of coupling, together with the plate and grid loading resistors (when required) is adjusted until the proper bandwidth characteristic is obtained. Additional similar stages can be cascaded, depending on the desired gain, as shown in the circuit of amplifier 90.

For this specific application, band-pass amplifier 90 has three stages of amplification while band-pass amplifiers 91 and 92 have two stages. The extra amplification in amplifier 90 is required for the purpose of overcoming the increased line losses due to the higher frequency of TV Channel Ten. Fine variation of gain in the individual channels may be obtained by varying the potential of the grid electrodes by means of gain control resistors 107.

The output of this system is arranged to feed the two output trunk lines 96 and 98. When it is desired to energize only one trunk line, then a resistance with a value equal to the trunk line impedance must be placed in the unused output terminal as previously referred to.

The output circuit is essentially a bridge arrangement in which the high frequency signals and the low frequency signals form opposite arms of the bridge. In effect, the two output terminals 135 and 138 are in series for the low frequency channels and in parallel for the high frequency channels. As referred to in connection with the circuit of Figure 3, the use of this type of circuit tends to minimize interaction between the low and high frequency channels and also reduces the amount of loss in signal transfer.

Referring now to Figure 5, between an antenna or other signal source 150, a plurality of multi-channel amplifier systems 151, 152 may be connected serially on the input side as indicated by the series connection 153 and may be connected to any suitable utilization means. For this purpose, outgoing trunk lines 154, 155 are provided for the amplifier system 151 and outgoing trunk lines 156 and 157 are provided for the amplifier system 152. On the input side, the trunk line connection 158 for the multi-channel amplifier system 152 may be resistance terminated to ground as indicated by the resistor termination 159, in case the line is not extended to other amplifiers in a similar manner.

The outgoing lines for the several amplifier systems may be suitably loaded with utilization devices such as television receivers 160—161 coupled to the lines 154 and 155 respectively through suitable coupling elements or devices 162 and 163.

The line 155, for example, may further be extended to a third multi-channel amplifier system 165 to the input side of which it is connected, and the line may then be resistance terminated as indicated at 166. The output terminals for this multi-stage amplifier system may be connected to any suitable load (not shown). One output line, if not used, may be resistance terminated as indicated at 167, while the other output line 168 may be utilized to supply any suitable load as above referred to.

It should be understood that the amplifier units or systems 151, 152 and 165 are individually constructed and arranged in accordance with the circuitry shown in Figures 1 and 4 for example and provide similar characteristics for suitably selecting, amplifying and finally combining a plurality of signals or frequency bands between the several trunk lines.

From the foregoing description it will be seen that in accordance with the invention, two or more trunk lines in the form of shielded or co-axial cables or the like, carrying a plurality of signal frequencies or bands of frequencies, such as television channel signals, may be coupled by selective amplifier means effective to raise or restore the signal level along a signal transmission system without appreciably impairing the signal conveying characteristic of either or any of the trunk lines so interconnected, while at the same time the respective frequency bands may be amplified to any suitable degree selectively. In this manner the function of the system to select specific signals or frequency bands of signals from a trunk line, to amplify these signals effectively and to finally combine and apply them to another trunk line is carried out with a minimum of inter-channel reaction and with a minimum of signal loss in the signal transmission trunk lines by reason of the insertion therein of the multiple channel electron tube signal amplifier means.

It will further be seen from the foregoing description that the multi-channel repeater and amplifier system in accordance with the present invention is particularly adapted for use in connection with the amplification of high frequency multiple-band signals such as presented by the various television channels or bands. It is further seen that a system in accordance with the invention while not limited thereto, is readily adapted for coupling between multichannel television signal conveying trunk lines for effectively maintaining the desired signal levels at all frequencies. This is particularly useful and effective for signal supply for multiple band television signals such as in a distribution system in an apartment house installation or the like.

What is claimed as new and useful is:

A multi-channel repeater and amplifier system comprising in combination, input and output signal trunk lines each having a signal conductor and a plurality of band-pass electronic-tube amplifiers connected in parallel relation between said trunk lines, each of said amplifiers being responsive only to a predetermined frequency band or channel for signals conveyed by said trunk lines, and a low-pass filter circuit included in at least one of said trunk line connections with said amplifiers comprising series inductances between spaced points in the signal conductor for the trunk line and the inter-electrodal capacities of the several amplifiers at said points, said low-pass filter circuit being operative to pass all of the frequency bands respectively passed by said band-pass amplifiers, whereby relative signal amplification between the trunk lines may be effected at predetermined levels and with a minimum of trunk signal attenuation, said inter-electrodal input capacities having corresponding ends thereof connected respectively to said spaced points of the trunk line and their opposite ends connected to a common point to provide shunt capacitance arms of said low-pass filter, certain of the signal amplifiers being responsive to higher frequency bands and certain of said amplifiers being responsive to lower frequency bands, and an output trunk line coupled effectively with the low frequency channels in series therewith and with at least one high frequency channel output in parallel therewith.

References Cited in the file of this patent

UNITED STATES PATENTS

| | | |
|---|---|---|
| 1,518,495 | Espenschied | Dec. 9, 1924 |
| 1,565,091 | Griggs | Dec. 8, 1925 |
| 1,688,036 | Clement | Oct. 16, 1928 |
| 1,965,720 | Nicolson | July 10, 1934 |
| 2,151,081 | Carlson et al. | Mar. 21, 1939 |
| 2,196,266 | Landon | Apr. 9, 1940 |
| 2,205,075 | Wilhelm | June 18, 1940 |
| 2,578,836 | Potter | Dec. 18, 1951 |
| 2,611,895 | Lacey | Sept. 23, 1952 |
| 2,716,733 | Roark | Aug. 30, 1955 |

FOREIGN PATENTS

| | | |
|---|---|---|
| 623,175 | Great Britain | May 13, 1949 |